(No Model.)

T. HARRINGTON.
HANDLE FOR SHOE KNIVES.

No. 319,091. Patented June 2, 1885.

Witnesses.
J. J. Maloney
H. P. Bates.

Inventor,
Theodore Harrington,
by Jos. P. Livermore
Att'y.

UNITED STATES PATENT OFFICE.

THEODORE HARRINGTON, OF SOUTHBRIDGE, MASSACHUSETTS.

HANDLE FOR SHOE-KNIVES.

SPECIFICATION forming part of Letters Patent No. 319,091, dated June 2, 1885.

Application filed March 27, 1885. (No model.)

*To all whom it may concern:*

Be it known that I, THEODORE HARRINGTON, residing in Southbridge, Worcester county, State of Massachusetts, have invented an Improvement in Handles for Shoe-Knives, of which the following description, in connection with the accompanying drawings, is a specification, like letters on the drawings representing like parts.

My invention, relating to shoe-knives or similar implements, is shown embodied in a shoe-knife of the kind having a thin slender blade, the knife being employed in connection with suitable patterns for cutting upper-leather, the said blade being connected with the handle by a clamp or chuck, so that a new blade may be readily inserted after the blade has been broken or worn out. The said clamp or chuck consists of jaws having curved or inclined portions, which, when drawn into the socket of the ferrule at the end of the handle, are pressed against the edges of the blade, so as to hold the same firmly. In knives of this class as heretofore made the handle and the ferrule at the end thereof have been round or circular in cross-section throughout the entire length, the handle being of such size that it can be contained wholly within the hand of the operator, whose thumb and finger grasp the handle at or near the ferrule. When the handle and ferrule are round, as heretofore made, it is difficult to hold the knife steadily, especially when the fingers are somewhat slippery.

The object of my invention is to provide a knife of this class which can be held securely without danger of slipping or turning in the hand of the operator.

The invention consists, essentially, in providing the ferrule or lower end of the handle with seats for the thumb and finger of the operator, the said seats being flat, or nearly so, and inclined to the axis of the knife-handle, and enabling the operator to hold the same firmly without danger of slipping in the hand.

Figure 1:
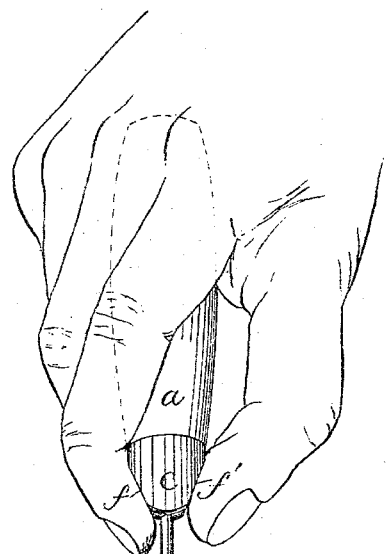
Figure 2:
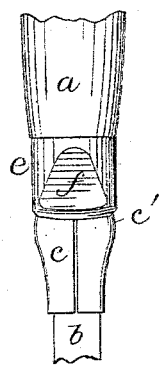
Figure 3:
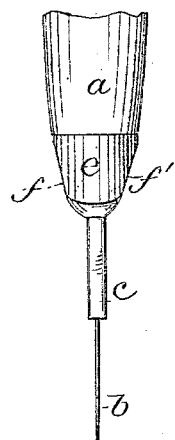
Figure 4:
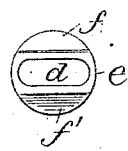

Figure 1 represents a knife embodying this invention as held in the hand of the operator in proper position for use. Figs. 2 and 3 are elevations at right angles to one another of the lower portion of the handle, showing the ferrule and chuck for holding the blade; and Fig. 4 is an end view of the ferrule.

The handle $a$, blade $b$, and chuck or jaws $c$, for holding the latter, are of usual construction, the said jaws being provided with curved or inclined portions $c'$, engaged by the ends of a socket, $d$, in the ferrule $e$, by which they are pressed against the edges of the blade $b$, when the said chuck is drawn inward toward the handle in the usual manner. The ferrule $e$ is provided with seats $f\,f'$, for the thumb and finger of the hand of the operator holding the knife, as shown in Fig. 1, the said seats being preferably flat surfaces on the sides of the ferrule corresponding to the sides of the blade $b$, and inclined or converging toward the blade, as shown in Fig. 3, so that the pressure of the thumb and finger thereon tends to draw the handle into the palm of the hand, the upper end of the handle resting against the palm of the hand, as will be understood by referring to Fig. 1. The knife is thus held securely in the hand, the seats $f\,f'$ affording sufficient bearing for the thumb and finger to effectually prevent the knife from turning in the hand, and thus rendering it much easier to operate and safer than knives in which the entire handle and ferrule are round, as heretofore made, in which construction it is very difficult to prevent the knife-handle from turning, especially when the hand is somewhat slippery.

Instead of making the seats for the thumb and finger flat surfaces, as described, they may be slightly concave, retaining, however, the same general position with relation to the handle.

I claim—

As an improved article of manufacture, a shoe-knife or other similar implement having a handle of suitable size to be held within the hand of the operator, the said handle being provided at the end adjoining the blade with two seats, one at each side of the blade, shaped and located to be engaged by the thumb and finger of the hand grasping the handle, enabling the same to be securely held without danger of turning, substantially as described.

In testimony whereof I have signed my name to this specification in the presence of two subscribing witnesses.

THEODORE HARRINGTON.

Witnesses:
ELISHA M. PHILLIPS,
EDGAR M. PHILLIPS.